US009182583B2

United States Patent
De Nooij et al.

(10) Patent No.: US 9,182,583 B2
(45) Date of Patent: Nov. 10, 2015

(54) STRUCTURED ILLUMINATION MICROSCOPY OPTICAL ARRANGEMENT INCLUDING PROJECTION ARTIFACT SUPRESSION ELEMENT

(71) Applicant: Mitutoyo Corporation, Kanagawa (JP)

(72) Inventors: Frans De Nooij, Eindhoven (NL); Paul Gerard Gladnick, Seatle, WA (US)

(73) Assignee: Mitutoyo Corporation, Kanagawa (JP)

( * ) Notice: Subject to any disclaimer, the term of this patent is extended or adjusted under 35 U.S.C. 154(b) by 200 days.

(21) Appl. No.: 14/081,885

(22) Filed: Nov. 15, 2013

(65) Prior Publication Data

US 2015/0136949 A1    May 21, 2015

(51) Int. Cl.
| | |
|---|---|
| *G06K 9/00* | (2006.01) |
| *G02B 21/36* | (2006.01) |
| *G02B 21/06* | (2006.01) |
| *H04N 5/235* | (2006.01) |

(52) U.S. Cl.
CPC .............. *G02B 21/361* (2013.01); *G02B 21/06* (2013.01); *H04N 5/235* (2013.01)

(58) Field of Classification Search
CPC ... H04N 5/235; H04N 5/2354; H04N 5/2256; G02B 21/06; G02B 21/361
USPC .............. 250/221, 222.1, 208.1, 548, 559.01; 382/141, 145, 151, 152, 255; 348/349
See application file for complete search history.

(56) References Cited

U.S. PATENT DOCUMENTS

| | | | |
|---|---|---|---|
| 5,452,129 | A | 9/1995 | Shiraishi |
| 5,739,855 | A | 4/1998 | Centen et al. |
| 7,324,682 | B2 | 1/2008 | Wasserman |
| 7,454,053 | B2 | 11/2008 | Bryll et al. |
| 8,111,905 | B2 | 2/2012 | Campbell |

(Continued)

FOREIGN PATENT DOCUMENTS

EP    1096274 B1    8/2004

OTHER PUBLICATIONS

Acute Optical Technology Co., Ltd., "Optical Filters>OLPF Filters (Optical Lowpass Filter)," <www.accuteoptical.com/OLPF_filter.shtml>, retrieved on Oct. 10, 2013, 3 pages.

(Continued)

*Primary Examiner* — Kevin Pyo
(74) *Attorney, Agent, or Firm* — Seed IP Law Group PLLC

(57) ABSTRACT

A structured illumination microscopy optical arrangement includes a projection path and an imaging path. The imaging path includes an imaging sensor and imaging optical elements. The projection path includes a light generator, a pattern generating element such as a spatial light modulator (SLM), and projection optical elements including an output lens and a projector artifact suppression element (PASE) located in the projection path between the SLM and the output lens. The PASE may include birefringent material which splits respective light rays of the structured illumination pattern source light to provide at least one replication of the structured illumination pattern with an offset transverse to the projection path. The offset replication of the structured illumination pattern increases the accuracy of the system by reducing spatial harmonic errors and spurious intensity variations due to projector pixel gap artifacts which may otherwise produce errors in resulting Z-height measurements.

20 Claims, 10 Drawing Sheets

(56) References Cited

U.S. PATENT DOCUMENTS 8,111,938 B2 2/2012 Bryll et al.
2014/0362203 A1* 12/2014 Delaney et al. ............... 348/79

OTHER PUBLICATIONS

Ekstrand et al., "Autoexposure for three-dimensional shape measurement using a digital-light-processing projector," Optical Engineering 50(12), Dec. 2011, 8 pages.
ETA Film Technology Inc., "OLPF: Optical Low Pass Filter," <www.etafilm.com.tw/OLPF.html>, retrieved on Oct. 10, 2013, 3 pages.
HIFI-REGLER Online-Shop, "DLP & LCD: Video-Projektionstechnik im Vergleich," <www.hifi-regler.de/special/dlp-lcd-videoprojektionstechnik.php?SID=484c3b03ded . . . >, retrieved on Oct. 10, 2013, 10 pages (with english google translation).
Grafix Plastics, "OptiGrafix$^{TM}$ OC Grade Polymer Film: Ultra Clear Optical Base Film," Summer 2005, 4 pages.
Kyocera Corporation, "Optical Devices," <global.kyocera.com/prdct/electro/product/xtalintro/opt.html>, retrieved on Oct. 10, 2013, 2 pages.
Wikipedia, the free encyclopedia, "Moirépattern," <en.wikipedia.org/wiki/Moir%C3%A9_pattern>, retrieved on Oct. 10, 2013, 9 pages.
Panasonic, "Comfortable 3D Viewing Experience," <www.panasonic.com/business/projectors/includes/features-home-theater.asp?v=pt-a . . . >, retrieved on Oct. 10, 2013, 1 page.
Panasonic, "Enhanced Dynamic Range with Advance Optical System," <www.panasonic.com/business/projectors/includes/features-home-theater.asp?v=pt-a . . . >, retrieved on Oct. 10, 2013, 1 page.
Panasonic, "Projector Reviews: Panasonic PT-AE1000U Projector Review—Image Quality," <www.projectorreviews.com/panasonic/pt-ae1000u/imagequality.php>, retrieved on Oct. 10, 2013, 8 pages.
Panasonic, "Smooth Screen Technology," <www.panasonic.com/business/projectors/includes/features-home-theater.asp?v=pt-a . . . >, retrieved on Oct. 10, 2013, 1 page.
"QVPAK 3D CNC Vision Measuring Machine Operation Guide," published Sep. 1996, 86 pages.
"QVPak 3D CNC Vision Measuring Machine User's Guide," published Jan. 2003, 330 pages.
Dejan Karadaglic, "Image formation in conventional brightfield reflection microscopes with optical sectioning property via structured illumination" Micron 39(3):302-310, Apr. 2008.
U.S. Appl. No. 13/912,116, filed Jun. 6, 2013, entitled "Structured Illumination Projection With Enhanced Exposure Control," 48 pages.

* cited by examiner

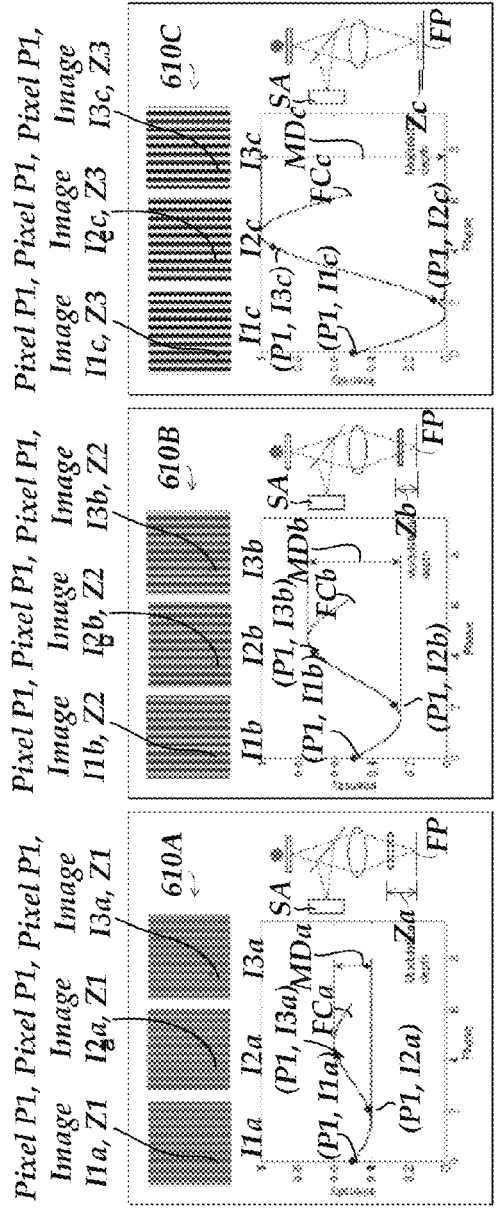
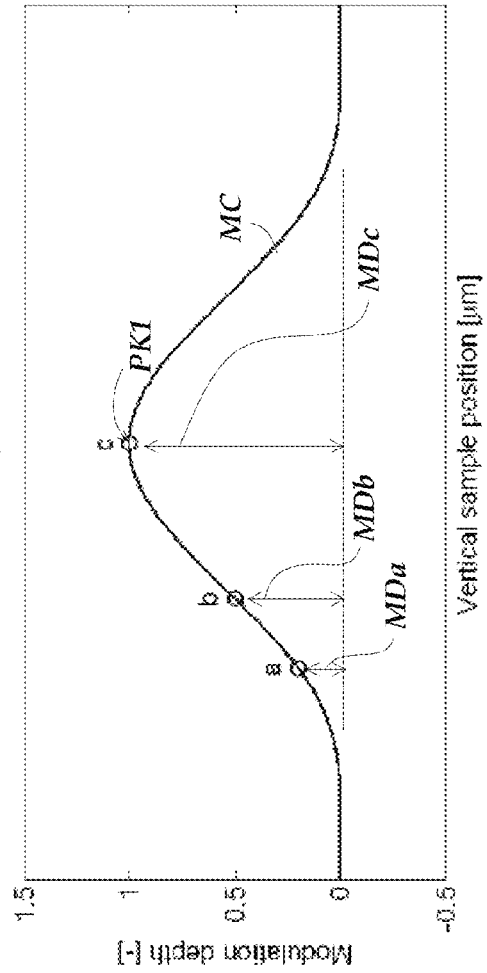
Fig.6A. Fig.6B. Fig.6C. Fig.6D.

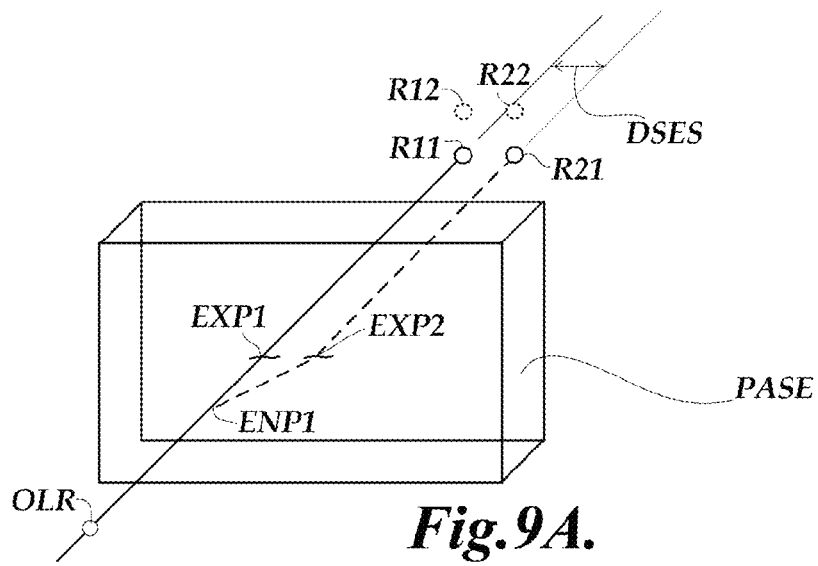
Fig.9A.
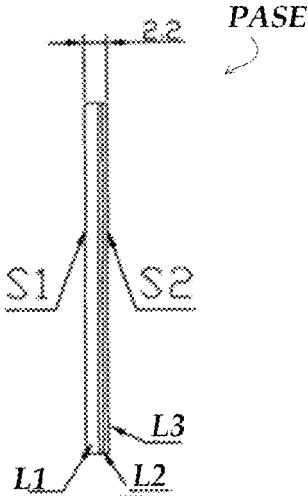
Fig.9B.
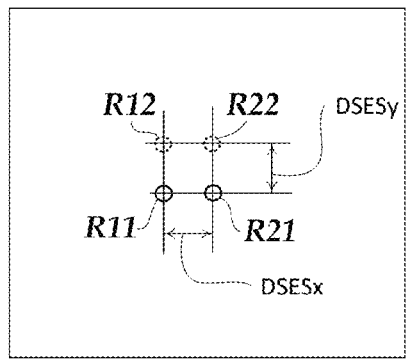
Fig.9D.
| Layer Number | Material | Thickness(mm) | Orientation angle | Rotation angle |
|---|---|---|---|---|
| 1 | Quartz | 0.92± 0.05 | +45± 1deg | 0± 1deg |
| 2 | Quartz | 0.65± 0.05 | +45± 1deg | +45± 1deg |
| 3 | Quartz | 0.65± 0.05 | +45± 1deg | -45± 1deg |
Fig.9C.

STRUCTURED ILLUMINATION MICROSCOPY OPTICAL ARRANGEMENT INCLUDING PROJECTION ARTIFACT SUPRESSION ELEMENT

TECHNICAL FIELD

The invention relates generally to metrology systems, and more particularly to systems utilizing structured illumination microscopy methods to obtain measurements of inspected objects.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system, that can be characterized as a general-purpose "off-line" precision vision system, is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system is able to use a microscope-type optical system and move the stage so as to provide inspection images of either small or relatively large workpieces at various magnifications.

Accuracies in the micron or sub-micron range are often desired in such systems. This is particularly challenging with regard to Z-height measurements. Z-height measurements (along the optical axis of the camera system) are generally derived from a "best focus" position, such as that determined by an autofocus tool. Determining a best focus position is a relatively complex process that generally depends on combining and/or comparing information derived from multiple images. Thus, the level of precision and reliability achieved for Z-height measurements is often less than that achieved for the X and Y measurement axes, where measurements are typically based on feature relationships within a single image. Recently, known techniques generally referred to as "structured illumination microscopy" (SIM) methods are being incorporated in microscopic measurement and inspection systems, in order to increase their measurement resolution and/or accuracy beyond the optical limits normally associated with simple imaging (e.g., to the micron and submicron level.)

Briefly, many SIM methods include projecting a pattern of light stripes onto a workpiece in a first image, and then shifting that pattern on the workpiece transversely to the stripes in a second image, and so on for a third image, or more. The resulting images may be analyzed according to known methods to improve the surface measurement resolution, as described in greater detail below. Such techniques may enhance X, Y, and/or Z measurements. However, the systems and methods used in known structured illumination pattern (SIP) generating subsystems (e.g., for forming and shifting the patterns) have so far limited the economy, versatility, and/or resolution and accuracy improvements of practical SIM systems in undesirable ways. In some methods of analysis, it is desirable for the stripes to exhibit a sinusoidal intensity profile across the stripes. In some systems, the SIM methods utilize sinusoidal patterns created by a digital mirror device (DMD) spatial light modulator (SLM) positioned in the projection path, and the optics project sinusoidal fringes onto a workpiece that is being measured. One advantage of such controllable digital SLM systems is that the size of the projected fringes can be adapted to be nearly optimum for any desired resolution, and/or imaging optics, and/or field of view. However, one disadvantage when the sinusoidal fringes are created with a digital SLM is that some of the higher harmonics of the fundamental sinusoidal frequency may be created and transferred by the optics through to the final light stripe images. The resulting height maps (HM) may contain effects from these higher harmonic artifacts, including Z-height errors which appear as approximately periodic "ripples", which interfere with the accuracy of the measurements produced by the system. Thus, an improved method for economically utilizing SIM techniques based on controllable digital SLM's, while reducing the production of error artifacts (e.g., Z-height "ripples") would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A structured illumination microscopy (SIM) optical arrangement is provided for obtaining measurements of inspected objects. In various implementations, the SIM optical arrangement includes a projection path and an imaging path. The imaging path includes an imaging sensor and a set of imaging optical elements, while the projection path includes a light generator, a pattern generating element, and a set of projection optical elements including an output lens and a projector artifact suppression element. The projector artifact suppression element may be configured such that its presence does not substantially alter the numerical aperture that would otherwise be provided by the projection optical elements of the SIM system.

In various implementations, the pattern generating element may comprise a controllable spatial light modulator (SLM) comprising an SLM pixel array having a characteristic SLM pixel pitch along a first direction. The pattern generating element receives radiation that is emitted from the light generator and is controlled for generating a structured illumination pattern as an output. In one specific implementation, the SLM pixel array may comprise a reflective digital light processing array. The set of projection optical elements directs the structured illumination pattern to provide structured illumination pattern source light to illuminate a field of view where a workpiece may be located, and includes an output lens that outputs the structured illumination pattern source light to the field of view. The set of imaging optical elements receives structured illumination pattern workpiece light that results from the structured illumination pattern source light having been reflected by or transmitted through a workpiece, and images the structured illumination pattern workpiece light along the imaging path toward the imaging sensor which includes an imaging pixel array. The set of imaging optical elements includes an objective lens that inputs the structured illumination pattern workpiece light from the workpiece. In various implementations, the output lens and the objective lens may be the same lens. The projector artifact suppression element is located in the projection path between the pattern generating element and the output lens, and is configured to split respective light rays of the structured illumination pattern source light and thereby provide at least one replication of the structured illumination pattern with an offset transverse to the projection path.

The projector artifact suppression element may be configured to split respective rays of the structured illumination pattern source light into a respective ordinary ray and a respective extraordinary ray such that an ordinary ray structured illumination pattern continues along the projection path and at least one extraordinary ray structured illumination pattern is the replication of the structured illumination pattern which continues along the projection path with an offset from the ordinary ray structured illumination pattern transverse to the projection path. The projector artifact suppression element may include at least one or two layers of birefringent material, and may be configured to provide at least two replications of the structured illumination pattern with an offset transverse to the projection path. The structured illumination pattern may be a fringe pattern with the long direction of the fringes extending along a direction that is transverse to the direction of the offset of the replication of the structured illumination pattern.

An SLM pixel array may include gaps between adjacent pixels, and the projector artifact suppression element may at least partially reduce intensity variations in the imaging pixel array due to gap image artifacts arising from gaps between adjacent pixels in the SLM pixel array. In one implementation the projector artifact suppression element is configured to reduce the intensity variations in the imaging pixel array based on replicating the gap image artifacts in the at least one replication of the structured illumination pattern such that, due to the offset, more pixels in the imaging pixel array receive similar amounts of the gap image artifacts.

DESCRIPTION OF THE DRAWINGS

FIGS. 6A-6D are diagrams illustrating a SIM technique using sequences similar to that of FIG. 5 at three different corresponding focus heights and an associated modulation depth curve for determining a peak modulation indicative of the best focus height and/or Z-height to be associated with the pixel.

FIGS. 9A-9D are diagrams illustrating various aspects of a projector artifact suppression element and associated split light rays that may be utilized to replicate a projected structured illumination pattern.

DETAILED DESCRIPTION

Figure 1:
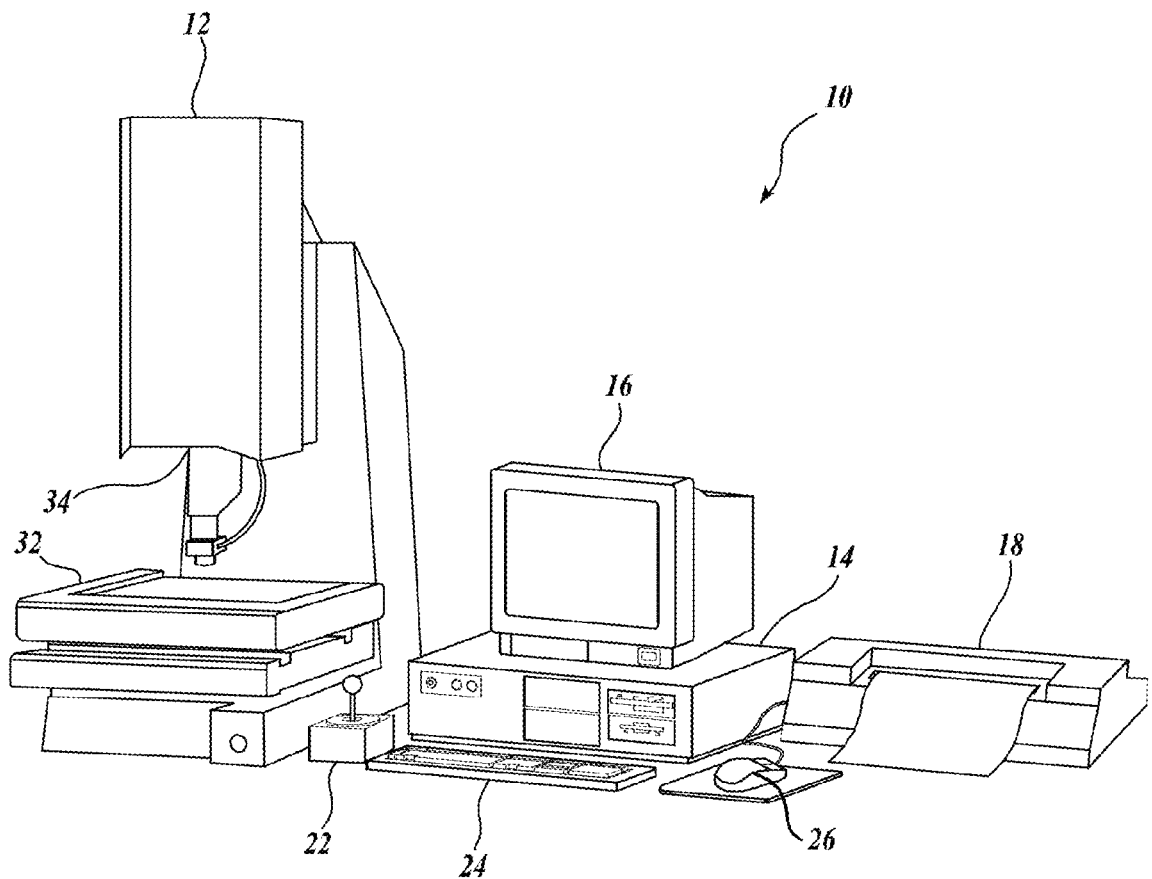
FIG. 1 is a diagram showing various typical components of a general purpose precision machine vision inspection system.

FIG. 1 is a block diagram showing various typical components of one exemplary precision machine vision inspection system 10 usable in accordance with configurations and methods described herein. The machine vision inspection system 10 includes a vision components portion 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various embodiments, a touchscreen tablet or the like may be substituted for and/or redundantly provide the functions of any or all of the computer system 14, the display 16, the joystick 22, the keyboard 24, and the mouse 26.

Those skilled in the art will appreciate that the controlling computer system 14 may generally consist of any computing system or device. Suitable computing systems or devices may include personal computers, server computers, minicomputers, mainframe computers, distributed computing environments that include any of the foregoing, and the like. Such computing systems or devices may include one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical based disks, flash memory devices, or any other type of non-volatile storage medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

The vision components portion 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053, 7,324,682, 8,111,905, and 8,111,938, which are each incorporated herein by reference in their entireties.

Figure 2:
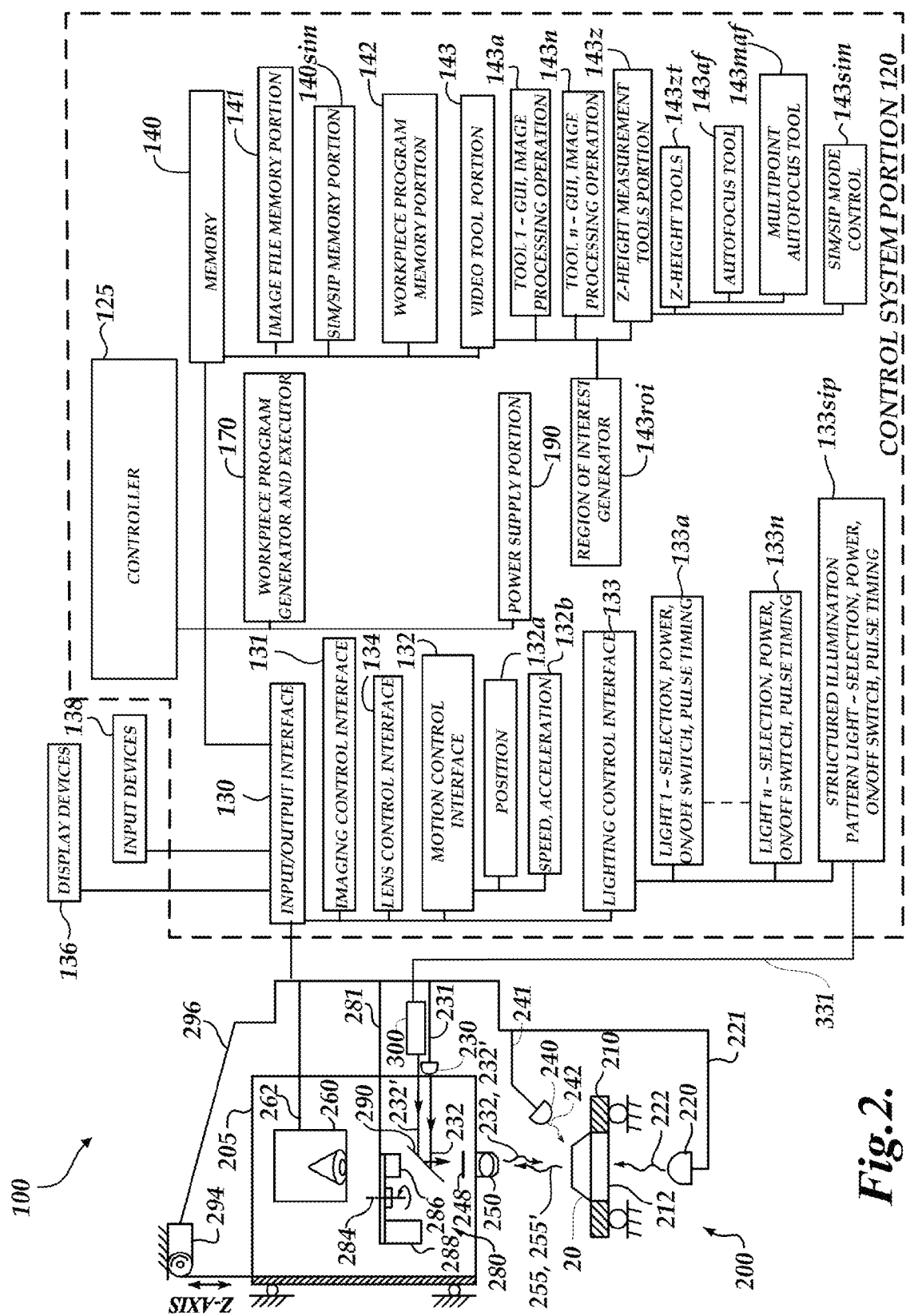
FIG. 2 is a block diagram of a control system portion and a vision components portion of a machine vision inspection system similar to that of FIG. 1, and including a structured illumination pattern generator and other features described herein.

FIG. 2 is a block diagram of a control system portion 120 and a vision components portion 200 of a machine vision inspection system 100 similar to the machine vision inspection system of FIG. 1, and including a structured illumination pattern generator and other features described herein. As will be described in more detail below, the control system portion 120 is utilized to control the vision components portion 200 and a controllable structured illumination pattern generating portion 300. The control system portion 120 may be arranged to exchange data and control signals with both the vision components portion 200 and the structured illumination pattern generating portion 300.

The vision components portion 200 includes an optical assembly portion 205, light sources 220, 230, and 240, and a workpiece stage 210 having a central transparent portion 212. The workpiece stage 210 is controllably movable along X- and Y-axes that lie in a plane that is generally parallel to the surface of the stage where a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included.

The optical assembly portion 205 is controllably movable along a Z-axis that is generally orthogonal to the X- and Y-axes, by using a controllable motor 294 that drives an actuator to move the optical assembly portion 205 along the Z-axis to change the focus of the image of the workpiece 20. Of course, in other embodiments, the stage could be moved along the Z-axis relative to a static optical assembly, in a known manner. The controllable motor 294 is connected to the input/output interface 130 via a signal line 296.

A workpiece 20, or a tray or fixture holding a plurality of workpieces 20, which is to be imaged using the machine vision inspection system 100, is placed on the workpiece stage 210. The workpiece stage 210 may be controlled to move relative to the optical assembly portion 205, such that the interchangeable objective lens 250 moves between locations on a workpiece 20, and/or among a plurality of workpieces 20.

As will be described in more detail below, for certain SIM operations the workpiece may be illuminated by SIP source light 232' provided from the structured illumination pattern generating portion 300. The structured illumination pattern generating portion 300 configures the structured illumination pattern that is output to the workpiece 20. One or more of a stage light 220, a coaxial light 230, structured illumination pattern generating portion 300, and a surface light 240 (e.g., a ring light) may emit source light 222, 232, 232' and/or 242, respectively, to illuminate the workpiece or workpieces 20. The light source 230 may emit source light 232 and the structured illumination pattern generating portion 300 may emit SIP source light 232' along a shared path including a beamsplitter 290, as described in greater detail with reference to FIG. 3. The source light is reflected or transmitted as workpiece light 255 and the workpiece light is used for imaging passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, 240 and the structured illumination pattern generating portion 300 may be connected to the control system portion 120 through signal lines or buses 221, 231, 241 and 331, respectively. To alter the image magnification, the control system portion 120 may rotate the turret lens assembly 280 along axis 284 to select a turret lens, through a signal line or bus 281.

In various exemplary embodiments, the optical assembly portion 205 is movable in the vertical Z-axis direction relative to the workpiece stage 210 using a controllable motor 294 that drives an actuator, a connecting cable, or the like, to move the optical assembly portion 205 along the Z-axis to change the focus of the image of the workpiece 20 captured by the camera system 260. The term Z-axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b, although such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100. The lighting control interface 133 also includes a lighting control element 133sip that, in the illustrated embodiment, works in conjunction with the structured illumination pattern (SIP) generating portion 300 to provide structured illumination during image acquisitions, and particularly during SIM mode image acquisitions, as described in greater detail below.

The memory 140 may include an image file memory portion 141, a SIM/SIP memory portion 140sim, a workpiece program memory portion 142 that may include one or more part programs, or the like, and a video tool portion 143. The video tool portion 143 includes video tool portion 143a and other video tool portions (e.g., 143n), which determine the GUI, image processing operation, etc., for each of the corresponding video tools, and a region of interest (ROI) generator 143roi that supports automatic, semi-automatic and/or manual operations that define various ROIs that are operable in various video tools included in the video tool portion 143.

In the context of this disclosure, and as known by one of ordinary skill in the art, the term video tool generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image processing operations and computations which are applied and customized in a particular instance by adjusting a few variables or parameters that govern the operations and computations. In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image processing operations of a particular instance of a video tool. It should be noted that the visible user interface features are sometimes referred to as the video tool, with the underlying operations being included implicitly.

The video tool portion 143 also includes Z-height measurement tools portion 143z, which provides various operations and features related to Z-height measurement operations, as described in greater detail below. In one embodiment, the Z-height measurement tools portion 143z may include Z-height tools 143zt and Z-height tools SIM/SIP mode control 143sim. The Z-height tools 143zt may include an autofocus tool 143af, and a multipoint autofocus tool 143maf, for example. The Z-height tools SIM/SIP mode control 143sim may govern certain aspects of image stack acquisition and related structured light pattern generation operations in conjunction with the Z-height tools that are configured in a mode that determines best focus heights and/or Z-height measurements based on SIM techniques (e.g., as described further below).

Briefly, the Z-height measurement tools portion 143z may perform at least some operations similarly to known Z-height measurement tools, for example, performing operations in learn mode and run mode for generating all or part of a focus curve, and finding its peak as a best focus position. Additional Z-height measurement tool operations may also be performed as will be described in greater detail below.

Alternative configurations are also possible for the Z-height measurement tools portion 143z. For example, the Z-height tools 143zt may provide additional Z-height measurement tool elements, or the Z-height tools may have a selectable mode option, which controls whether they are configured to operate in a conventional contrast-based analysis mode that uses conventionally lighted images (e.g., using the light source 230 to provide source light 232), or a SIM based analysis mode that uses images lighted with specific structured illumination patterns (e.g., using the structured illumination pattern generating portion 300 to provide SIP source light 232'). In either case, the SIM/SIP mode control 143sim may provide operations that govern the user interface and interrelationships of the Z-height measurement tool elements in a manner that corresponds to their operating mode and/or use of SIM image acquisition and analysis techniques. More generally, it will be appreciated that such techniques may be implemented in any now-known or later-developed form that is operable in conjunction with the machine vision inspection system 100 to provide the features described herein in relation to measurement operations based on SIM image acquisition and analysis techniques.

Figure 3:
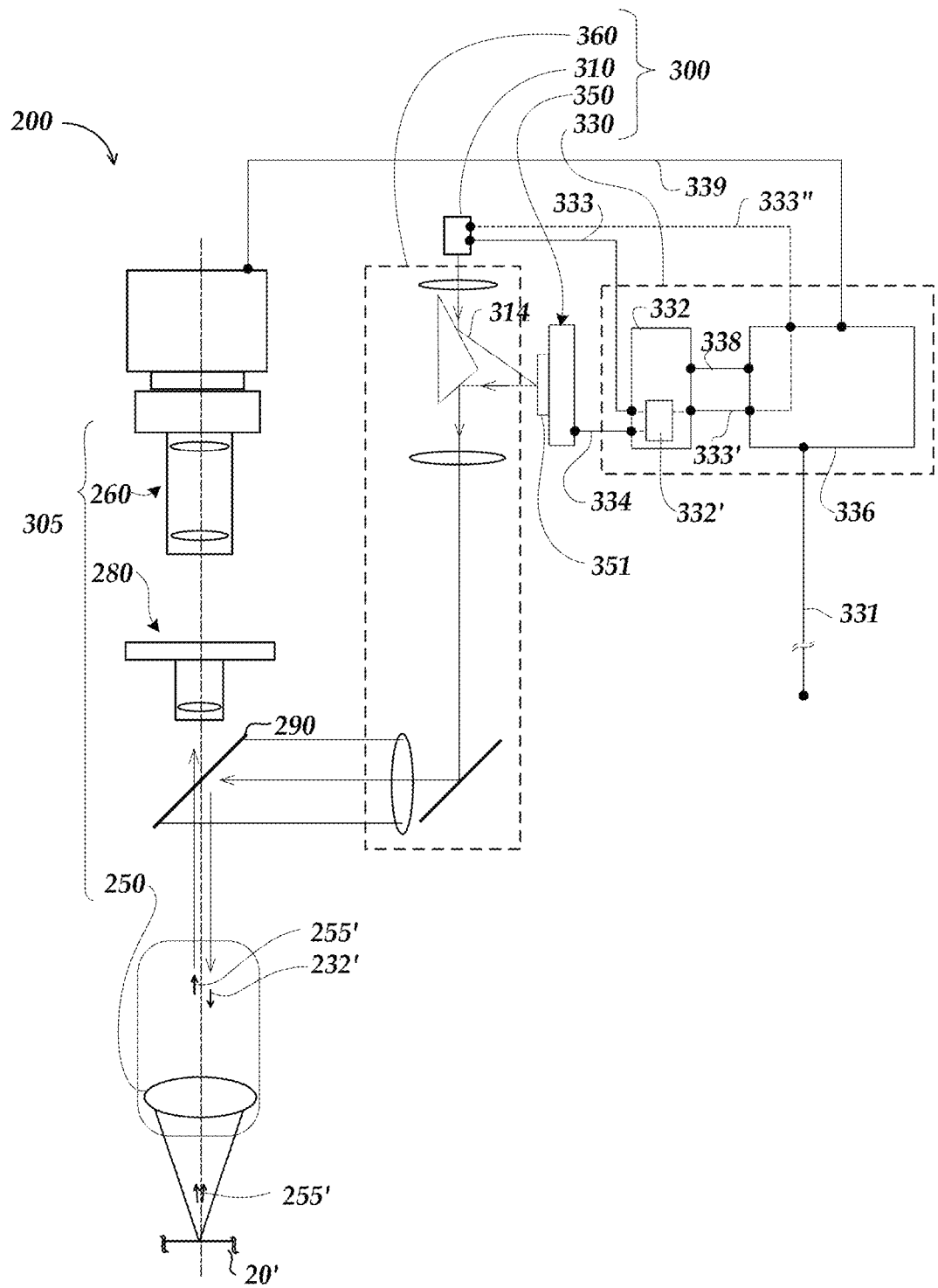
FIG. 3 is a block diagram including one exemplary embodiment of the structured illumination pattern generator shown in FIG. 2.

The signal line 262 from the camera system 260 and the signal line 296 from the controllable motor 294 are connected to the input/output interface 130. In addition to carrying image data, the signal line 262 may carry a signal from the controller 125 or elsewhere that initiates image acquisition. One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. The display devices 136 may display user interface features associated with the video tools FIG. 3 is a block diagram showing a portion of the vision system components portion 200 of FIG. 2, including showing additional details of one exemplary embodiment of the structured illumination pattern generator 300, which may be used to implement various pattern generation and image exposure methods. The structured illumination pattern generator 300 and associated methods are described in more detail in copending and commonly assigned U.S. patent application Ser. No. 13/912,116, entitled "Structured Illumination Projection With Enhanced Exposure Control", filed on Jun. 6, 2013, which is hereby incorporated by reference in its entirety. In the illustrated embodiment, the structured illumination pattern generating portion 300 comprises a SIP optical portion 360, a light generator 310, a spatial light modulator (SLM) 350 which includes a controllable pixel array 351 that is configured in various patterns to create a pattern of transmitted and/or blocked light, and a SIP controller 330. The SIP controller 300 may include a timing and synchronization portion (TSP) 336, and an SLM controller portion 332 which may include a grayscale pattern sequencer 332'. The SLM controller portion 332 may be connected to the SLM 350 and the light generator 310, and the TSP 336, for example, through signal lines or buses 334, 333 and 338, respectively.

In operation, the light generator 310 may emit light 314 through a first part of the SIP optical portion 360 such that it is properly configured (e.g., collimated) to illuminate an illumination area of the pixel array 351 of the SLM 350. The SLM 350 may then generally transmit, partially transmit, or block light according to known methods, to transmit or project a desired pattern along an optical path through the remainder of the SIP optical portion 360. As shown in FIG. 3, the projected pattern is output from the SIP optical portion 360 to be input to the beamsplitter 290, where it is directed as coaxial light through the objective lens 250 to provide SIP source light 232' to illuminate the field of view.

In some embodiments, the SLM 350 may comprise a reflective or transmissive LCD type array, such as a microdisplay graphics array from Forth Dimension Displays headquartered in Dalgety Bay, Fife, Scotland, United Kingdom, which includes an LCD pixel array that may generally be controlled by conventional video signals, if desired, and may be used to display an electronically generated 8-bit grayscale pattern that may transmit, partially-transmit, or block the light 314 through any given pixel of the pattern, depending on its grayscale value. However, in various implementations the SLM 350 may comprise an arrangement of any now-known or later-developed type of controllable reflective shutters that can provide controllable light deflection in a desired pattern. One type of controllable reflective shutter array that may be used includes liquid crystal on silicon (LCOS) micro-display products available, for example, from Forth Dimension Displays headquartered in Dalgety Bay, Fife, Scotland. Various implementations may generally incorporate another type of array, which is digital micro mirror device (DMD). DMD's and associated components are available, for example, from Texas Instruments DLP Products, Plano, Tex. DLP generally stands for digital light processing, which is associated with the fact that the array elements in DMD devices are either in an "on" position or "off" position, and projected/transmitted grayscale patterns must be generated over a time as an accumulated sequence of superimposed binary patterns.

In various embodiments, the light generator 310 may be used in a strobe illumination mode of operation to provide a combination of a very fast light generator response time (in the μs or ns range) at suitable optical power levels. One example of a light generator 310 may include one or more high intensity light emitting diodes (LEDs), such as one of the LEDs in the Luxeon™ product line, available from Philips Lumileds Lighting Company, of San José, Calif.

In the embodiment shown in FIG. 3, the SLM 350 may be a commercially available DMD, and the SLM controller portion 332 may be a companion digital controller chip, such as the chip sets available from Texas Instruments DLP Products, referenced above. The SLM controller portion 332 may respond to desired grayscale pattern definitions or requests, and generate the synchronized control signals to the SLM 350 and the light generator 310 that provide the accumulated sequence of superimposed binary patterns that generate the desired grayscale pattern over time. As described in more detail in the previously incorporated '116 application, commercial SLM controllers may have certain deficiencies, and in the illustrated embodiment, the TSP 336 may be used in conjunction with the SLM controller portion 332 to overcome or reduce these deficiencies, for example, by allowing the grayscale control finer than 256 bits, and/or other advantages, in some embodiments or implementations. In various embodiments, the TSP 336 may receive grayscale pattern and exposure level requests or control signals from the SIP lighting control element 133sip, and/or the SIM/SIP memory portion 140sim (which may store predetermined or learned control signal configurations or parameters related to various desired patterns), over the line or bus 331. The TSP 336 may then process the received signals and send multiple incremental grayscale pattern requests to the SLM controller portion 332, such that the SLM controller portion 332 may generate each of the incremental grayscale patterns with 256-bit resolution over time, using its native control routines and circuits to control the SLM 350 and the light generator 310. The TSP 336 may thus control an overall image exposure achieved by the multiple incremental grayscale patterns, because it may control the number of incremental requests within an image integration period of the camera 260, with which it may exchange control signals over the line 339. In various embodiments, some of the incremental requests may be for identical patterns and/or exposure increments. In some embodiments, one or more of the incremental requests may be for different patterns and/or exposure increments. Greater than 256-bit grayscale resolution for the illumination pattern may be achieved in this manner, if desired. In general, it is desirable that the TSP 336 provides dedicated processing and deterministic timing in relation to the control signals it receives and/or sends to various components. In some embodiments, the TSP 336 may therefore comprise a programmable logic array, or the like. In some (optional) embodiments, rather than the SLM controller portion 332 directly controlling the light generator 310, the line 333 may be omitted and a light control timing signal from the SLM controller portion 332 may be output to the TSP 336 on the line 333', and the TSP 336 may control the light generator 310 over the line 333", based on the timing signal from the SLM controller portion 332. This may allow providing additional features and/or precise customized control of the light generator 310 within the timing window required by the native operations of the SLM controller portion 332. Various features and operations outlined above are described in greater detail below.

Figure 4:
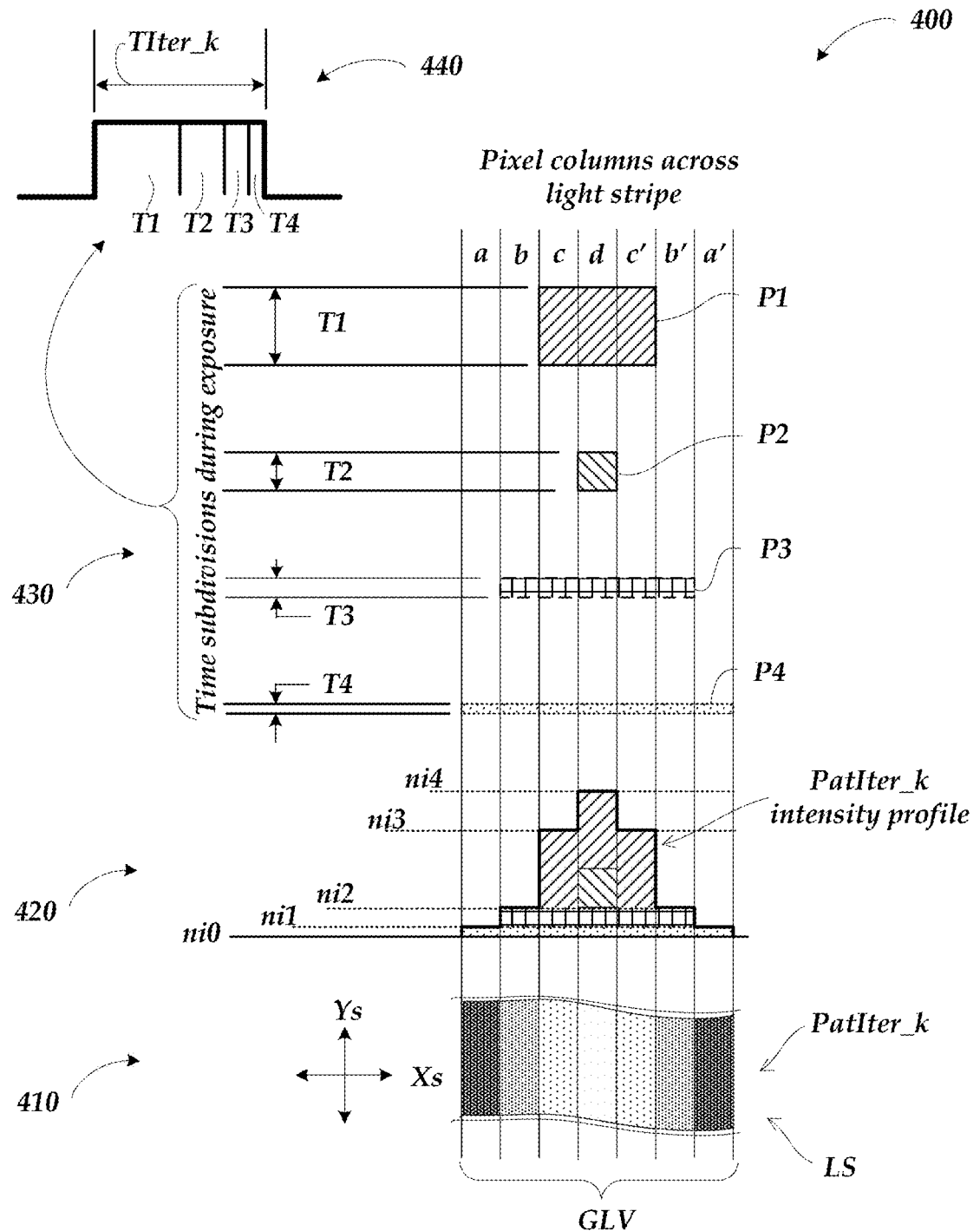
FIG. 4 is a diagram schematically representing one typical method used in a spatial light modulator such as that shown in FIG. 3, for a gray-level illumination pattern generation sequence during an image exposure period.

FIG. 4 is a diagram 400 schematically representing one typical native control method used with a spatial light modulator such as the spatial light modulator 350 shown in FIG. 3, for projecting a gray-level pattern of illumination during an image exposure period. In particular, FIG. 4 schematically represents the generation of a roughly sinusoidal gray-level intensity variation GLV across a single structured illumination light stripe LS1, as created by a DLP device such as a digital micro-mirror device.

The diagram 400 illustrates a pattern subdivision exposure sequence 430 comprising a plurality of respective pattern portions P1-P4 (also referred to as subdivision pattern portions) exposed using respective iteration intensities of radiation from a light generator during respective iteration subdivision times T1-T4, respectively. The pattern subdivision exposure sequence 430 builds a simple 4-bit gray-level sine wave pattern for the purpose of illustrating the basic principles that are described below.

The diagram 400 includes corresponding elements that are vertically aligned along "pixel columns across light stripe". A truncated "plan view" shows a roughly sinusoidal gray-level intensity variation GLV across the single structured illumination light stripe LS1, which is a stripe extending along the direction Ys. The lighter and darker shadings across the stripe LS represent the accumulated exposure or net intensity resulting from the intensity pattern subdivision exposure sequence 430, which is designated PatIter_k, indicating that it may correspond to a complete grayscale pattern exposure iteration or increment k (e.g., k=1, 2, 3, etc.), as described further below. This particular stripe is lightest along the pixel column d and darkest along pixel columns a and a'. Immediately above the plan view representation of PatIter_k is a graph schematically representing the contributions to the net intensity profile across the PatIter_k. The graph uses crosshatch patterns that are coded to be the same as the crosshatch patterns used to indicate the pixel columns that are activated to provide the respective subdivision pattern portions P1-P4 during respective subdivision times T1-T4. It is assumed that the light generator is set to the same intensity for each of the times T1-T4, such that the accumulated intensity is proportional to the times. The times T1-T4 are binary subdivisions, that is T3=2*T4, T2=2*T3, and T1=2*T2. It is shown that the pixels of the brightest column d are "on" in each of the subdivision pattern portions P1-P4, to provide the net intensity ni4. The pixels of the next brightest columns c and c' are "on" in each of the subdivision pattern portions except P2, to provide the net intensity ni3. The pixels of the next brightest columns b and b' are "on" only in the subdivision pattern portions P3 and P4, to provide the net intensity ni2, and the darkest columns a and a' are on only in the subdivision pattern portion P to provide the net intensity ni1. The timing diagram 440 shows that the total time to generate the gray-level strip pattern PatIter_k is TIter_k, assuming negligible time between the time periods T1-T4, for the purposes of this illustration. It will be appreciated that latency times, delays, and the like may be calibrated or determined for particular machines, light generators, voltage levels, etc., by design and/or experiment, and the results calibrated or stored (e.g., in the SIM/SIP memory portion 140sim), such that a combination of timing, operating voltages, and the like, that provide a desired or calibrated illumination level may be readily determined and/or compensated for (e.g., in the operation of the SIP controller 330).

The typical native control method outlined above may be used in DLP controllers (e.g., in a digital DMD controller), which adjust the overall time TIter_k, and/or the light generator intensities used during the subdivision times, to achieve a desired net gray-level intensity pattern.

A general transfer function for a sine pattern exposure during a single image, as outlined above with reference to FIG. 4, may be expressed as:

$$\text{PatIter\_k} = [P1*I1*T1] + \ldots + [Pn*In*Tn] = \sum_{i=1}^{n}[Pi*Ii*Ti] \quad \text{(Eq. 1)}$$

where PatIter_k=the "k" th iteration of a complete gray-level pattern (e.g., a stripe having a sinusoidal gray-level intensity profile across the stripe), within an image exposure period; Ti=a pattern generation time subdivision (e.g., one of the time subdivisions T1-T4 as illustrated in FIG. 4); Pi=Pattern subdivision i (e.g., the partial pattern of SLM pixels that is on during one of the pattern generation time subdivisions Ti (e.g., one of the pattern subdivisions P1-P4 as illustrated in FIG. 4)); Ii=Light intensity during the time subdivision Ti. In certain configurations, binary time subdivisions are implemented, such that $Ti=T(i-1)/(2^{(i-1)})$, and a constant intensity may be utilized throughout a single set of the pattern subdivisions, such that $I_1=I_2=I_n$, as implied in the illustration shown in FIG. 4.

The typical native control method outlined above adjusts the overall time TIter_k, which is equivalent to increasing each of the times Ti and/or the light generator intensities Li used during the subdivision times, to achieve a desired net gray-level intensity pattern increase. However, as described in the '116 application, this approach may lead to certain deficiencies, and the SIM measurement accuracy may be sensitive to some selections of these variables that would be of no consequence in many other applications. Therefore, the typical native control method for DLP's may be inadequate for certain high resolution precision machine vision inspection operations, and certain high accuracy SIM applications in particular, for which related problems and solutions are described in greater detail in the '116 application.

Figure 5:
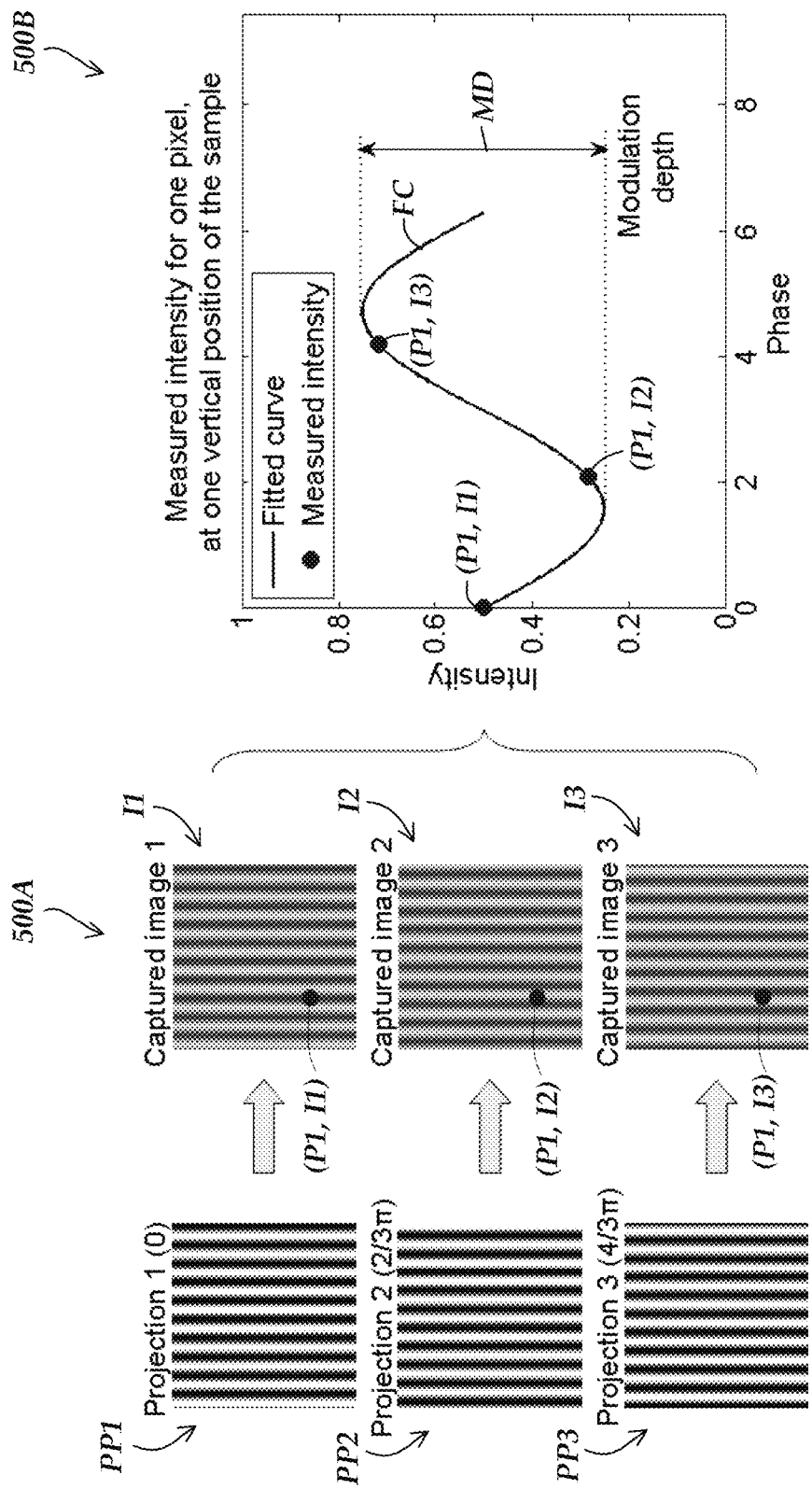
FIG. 5 is a diagram illustrating a known SIM technique comprising a sequence of three projected structured illumination patterns with different phases and corresponding captured images and an associated measured intensity curve of a single pixel for determining a modulation depth.

FIG. 5 is a diagram illustrating a known SIM technique. In the illustrated example, as shown in the illustration portion 500A, the technique comprises projecting a sequence of three structured illumination patterns PP1-PP3 with different phases (e.g., an effective spatial phase shift of 120 degrees of the spatial period of the projected stripe pattern between phases) onto a workpiece and capturing corresponding images I1-I3. Assuming the same exposure level for each image, and a repeatable sinusoidal intensity variation across the stripes in the projected stripe pattern in each image, then one would expect results analogous to those shown in the illustration portion 500B at the same pixel location in each of the images I1-I3. In particular, according to the assumptions above, one expects the pixel location P1 to have an intensity in the images I1-I3 that is proportional to the intensity of three locations across the sinusoidal stripe intensity profile, where the three locations are separated by 120 degrees of spatial phase shift. This is illustrated in 500B by the three intensity values (P1,I1), (P2,I2), and (P3,I3). The SIM technique then includes fitting a sinusoidal curve FC to the three intensity values for the pixel location P1. The amplitude of the resulting fit curve FC, also known as the modulation depth MD, will be greatest when the workpiece at the pixel location P1 is at the best focus position. This is because the stripe contrast will be blurred at focus positions away from the best focus position, so the modulation depth MD will be lower in that case.

FIGS. 6A-6D are diagrams illustrating a SIM technique using a sequence of steps similar to that of FIG. 5, at three different focus heights Za, Zb, Zc. An associated modulation depth curve MC is formed to determine a peak modulation Z-height that is indicative of the best focus height and/or Z-height associated with a particular pixel location on a workpiece.

As shown in FIG. 6A, a series 610A of three phase shifted images I1a-I3a (that is, with the illumination pattern phase shifted) are captured at a vertical position Za. The small image of the optical system in FIG. 6A shows that the projected illumination arising from the source SA, as well as the imaging system, are focused at a plane FP and the Z-height Za is far from FP. As a result the corresponding modulation depth MDa is relatively small. As shown in FIG. 6B, a series 610B of three phase shifted images I1b-I3b are captured at a vertical position Zb. The small image of the optical system in FIG. 6B shows that the projected illumination arising from the source SA, and well as the imaging system, are focused at a plane FP, and the Z-height Zb is closer to FP than was Za. As a result the corresponding modulation depth MDb is relatively larger than MDa. As shown in FIG. 6C, a series 610C of three phase shifted images I1c-I3c are captured at a vertical position Zc. The small image of the optical system in FIG. 6C shows that the projected illumination arising from the source SA, as well as the imaging system, are focused at a plane FP and the Z-height Zc is approximated at FP. As a result the corresponding modulation depth MDc is approximately as large as possible.

As shown in FIG. 6D, the modulation depths MDa-MDc are plotted against their corresponding Z-heights (labeled vertical sample position), and a modulation depth curve MC is fitted to the plotted points. The peak of the modulation depth curve MC indicates the Z-height where the corresponding pixel location on the workpiece is in focus.

The SIM techniques outlined above are known to be capable of producing high resolution Z-height measurements with high lateral resolution. However, as will be apparent to one skilled in the art, the accuracy of the techniques depends at least in part on the accuracy of the fringe images (e.g., the fidelity of the projected sinusoidal fringes and the resulting images) and of any resulting height maps that may be produced as part of the measurement process. As will be described in more detail below with respect to FIGS. 7 and 8, various Z-height "ripple" effects may be caused by various projection and/or imaging artifacts which may negatively affect the accuracy. It will be appreciated that due to the high resolution potential of the SIM technique, that even very small erroneous variations in the intensity and/or intensity profile will be significant to the resulting accuracy.

Figure 7:
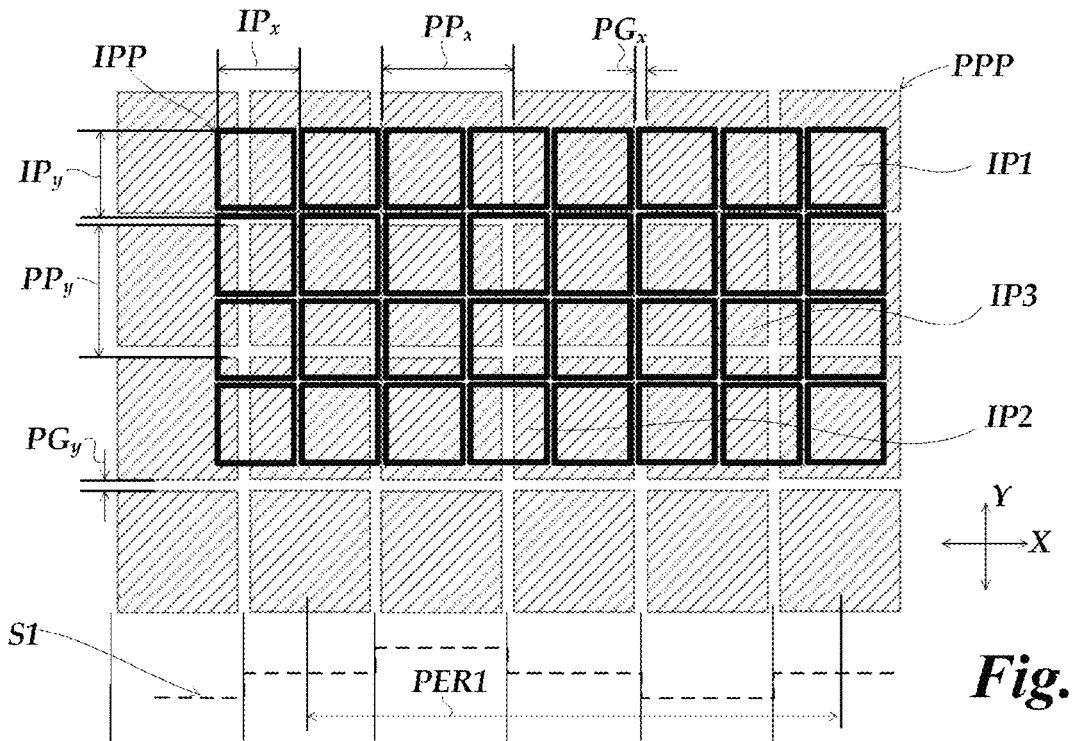
FIG. 7 is a diagram illustrating projector pixel gap image artifacts as received by pixels in an imaging pixel array.

FIG. 7 is a diagram illustrating a problem due to projector pixel gap image artifacts in projected pixel pattern PPP relative to an imaging pixel array IPP. In one implementation, the projected pixel pattern PPP may correspond to at least a portion of a magnified and imaged representation of the SLM pixel array 351 and correspondingly generated structured illumination pattern SIP of FIG. 3, and the imaging pixel array IPP may correspond to at least a portion of an imaging pixel array of the camera system 260 of FIG. 3. The projected pixel pattern PPP is shown to include imaged pixel representations having an X-direction projected pixel pitch PPx, and a Y-direction projected pixel pitch PPy. The pixel representations have spacings between them designated as an X-direction projected pixel gap PGx, and a Y-direction projected pixel gap PGy, respectively. In one specific example implementation, the projected pixel gaps PGx and PGy may correspond to small gaps between mirrors in an SLM pixel array. The imaging pixel array IPP similarly includes pixel representations having an X-direction imaging pixel array pitch IPx, and a Y-direction imaging pixel pitch IPy.

In the implementation of FIG. 7, the amount of projector pixel gap image artifacts corresponding to the projected pixel gaps PGx and PGy that are received by the individual pixels of the imaging pixel array IPP may cause significant intensity variations from pixel to pixel. As specific representative examples, a first imaging pixel IP1 is illustrated as receiving no pixel gap image artifact and no corresponding intensity reduction corresponding to a projected pixel gap, while a second imaging pixel IP2 is illustrated as receiving a pixel gap image artifact and an intensity reduction corresponding to only an X-direction projected pixel gap PGx, and a third imaging pixel IP3 is illustrated as receiving a pixel gap image artifact and an intensity reduction corresponding to both X- and Y-direction projected pixel gaps PGx and PGy. Such varying gap image artifacts are problematic in that they cause erroneous periodic intensity variations in the resulting SIM images, which results in corresponding Z-height errors resembling periodic "ripples" in surface height maps that are produced by the SIM system.

Importantly, inaccuracies may also result due to spatial harmonics included in a coarse resolution sine wave pattern carried by the projected pixel pattern PPP. More specifically, an idealized schematically represented output signal S1 (which is illustrated below the projected pixel pattern PPP), comprises a coarse sine wave with a period PER1 which extends over the width of approximately four columns of the projected pixel pattern PPP. As indicated, the coarse sine wave signal S1 varies over only three distinct signal levels, and is schematically representative of one simplified example implementation of signals which may be utilized in the SIM technique of the configuration of FIG. 3. Due to the coarse nature of the sine wave signal S1, a relatively high spatial harmonic content may be present, which may result in inaccuracies in the corresponding measurements that are produced. As will be described in more detail below with respect to FIG. 8, according to principles disclosed herein, such inaccuracies from these harmonic content effects may be reduced through the utilization of one or more replicated projected pixel patterns. Thus, it will be appreciated that the principles disclosed herein may be used to address either of these causes of inaccuracy or artifacts, separately and/or in combination.

Figure 8:
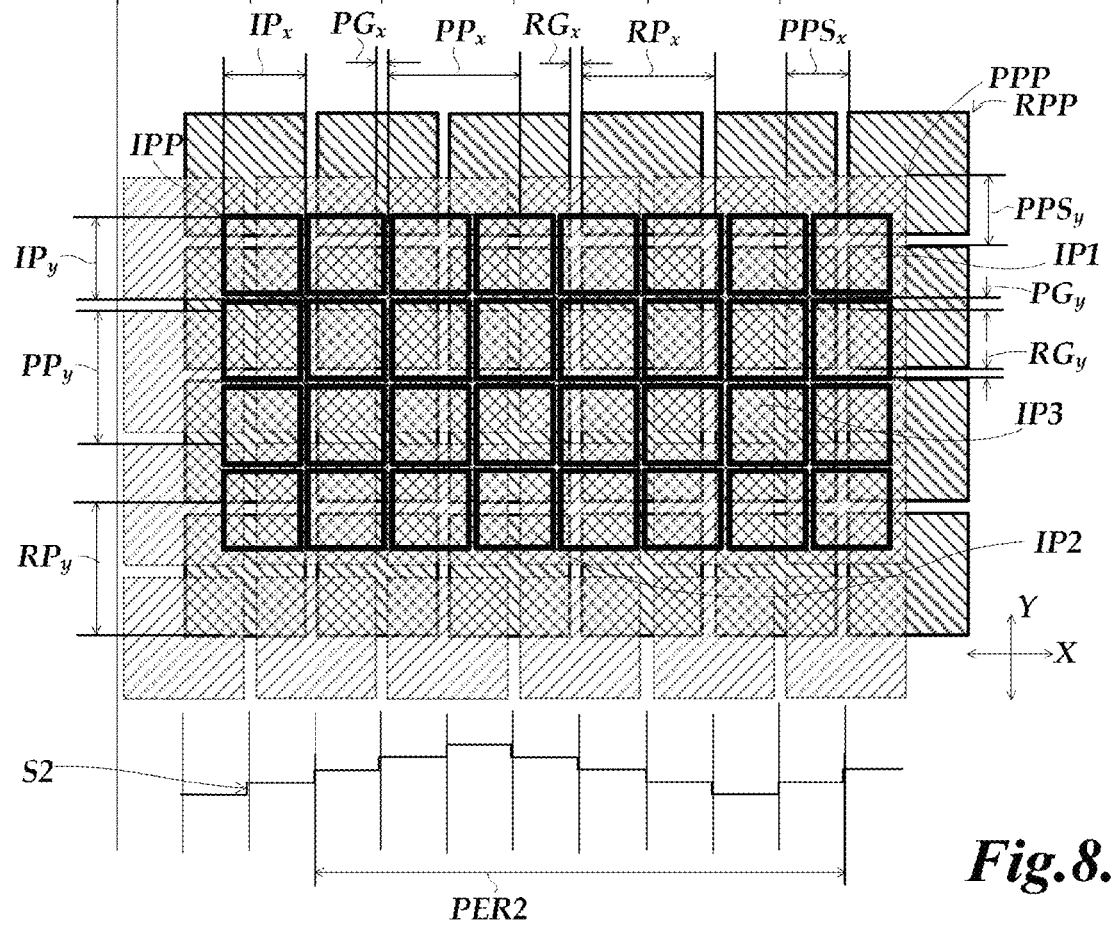
FIG. 8 is a diagram illustrating the utilization of a replication of the projector pixel gap image artifacts of FIG. 7 to reduce intensity variations due to the gap image artifacts as received by the pixels in the imaging pixel array.

FIG. 8 is a diagram illustrating the utilization of a replication of the projector pixel gap image artifacts of FIG. 7 to reduce intensity variations due to the gap image artifacts as received by the pixels in the imaging pixel array. In particular, FIG. 8 illustrates a replicated projected pixel pattern RPP which is generated to reduce the above-described effects which negatively impact the accuracy of the system. The replicated projected pixel pattern RPP is shown relative to the original projected pixel pattern PPP and the imaging pixel array IPP of FIG. 7. As shown in FIG. 8, the replicated projected pixel pattern RPP includes pixel representations having an X-direction replicated projected pixel pitch RPx, and a Y-direction replicated projected pixel pitch RPy. The imaged location of the replicated projected pixel pattern RPP is shown to be offset relative to the original projected pixel pattern PPP by an X-direction projected pattern shift PPSx, and a Y-direction projected pattern shift PPSy. As will be described in more detail below with respect to FIGS. 9A-9D, in one implementation, a projector artifact suppression element may be utilized that splits or replicates an original light ray with an offset in a first direction, and then splits or replicates the light rays again with an offset in a second direction, which equates to splitting or replicating the image of each pixel of the original projected pixel pattern PPP into four. However, in order to simplify the explanation and representation illustrated in FIG. 8, a simpler embodiment showing only the projected pixel pattern PPP and the replicated projected pixel pattern RPP will be described.

The pixel representations of the replicated projected pixel pattern RPP have spacings between them designated as X-direction projected pixel gaps RGx and Y-direction projected pixel gaps RGy. One result of adding the replicated projected pixel pattern RPP in the specific embodiment of FIG. 8 is that the pixels of the imaging pixel array IPP receive a more consistent amount or a more uniform distribution of the projector pixel gap image artifacts. As a specific representative example, the imaging pixel IP1 is illustrated as receiving a pixel gap image artifact and an intensity reduction corresponding to both X-direction and Y-direction projected pixel gaps RGx and RGy, in contrast to FIG. 7 where no pixel gap image artifact or intensity reduction corresponding to projected pixel gaps were received by the imaging pixel IP1. The imaging pixel IP2, which in FIG. 7 was shown to receive a pixel gap image artifact and intensity reduction corresponding to only an X-direction projected pixel gap PGx, in FIG. 8 is shown to also receive a pixel gap image artifact and an intensity reduction corresponding to a Y-direction projected pixel gap RGy. The imaging pixel IP3 is shown to receive the same signal effects corresponding to the X- and Y-direction projected pixel gaps PGx and PGy as were illustrated in FIG. 7. Thus, each of the imaging pixels IP1, IP2 and IP3 is illustrated in FIG. 8 as receiving similar common-mode signal effects from two projected pixel gaps, through the utilization of the replicated projected pattern pixels RPP.

It will be appreciated that even in an implementation where an identical number of pixel gap image artifacts are not received by each of the pixels of the imaging pixel array IPP, the effects of the projected pixel gaps may be reduced to some degree through the utilization of the replicated projected pixel pattern RPP. In some implementations, the suppression of the projected pixel gap effects may be considered to be achieved by making the projected pixel gap effects at least partially a common mode effect in a majority of the pixels of the imaging pixel array IPP. In the embodiment of FIG. 8, the projected pattern shifts PPSx and PPSy are indicated as being approximately one-half of the projector pattern pixel pitch PPx and PPy, respectively, although in other implementations different fractions of the projected pixel pitch may be utilized. It will be appreciated that in various implementations, different projected pattern widths and pixel pitches may be utilized according to the needs of the workpiece magnification, workpiece characteristics, desired field of view, etc. As will be described in more detail below with respect to FIGS. 9A-9D and 10, in various embodiments it may be desirable that a projector artifact suppression element that is utilized to replicate the projected pixel pattern may be dimensioned in relation to the projected pixel pitch rather than the imaging pixel pitch.

As indicated previously, in addition to the above-described issues that arise from the projected pixel gaps, the replication of the projected pixel pattern may also address issues related to the high spatial harmonic content described above with respect to the signal S1. As shown in FIG. 8, a signal S2 is illustrated beneath the projected pixel pattern PPP and the replicated projected pixel pattern RPP. The signal S2 will be understood to correspond to a portion of an output produced by image pixels due to the combination of the pixel patterns PPP and RPP, and is shown to have a period PER2 with a width equal to approximately four columns of the projected pixel pattern PPP. The signal S2 is shown to have a finer spatial resolution than the signal S1, in that while the signal S1 was shown to vary over only three distinct signal levels, the signal S2 is shown to vary over five distinct signal levels and in increments that are only ½ as wide. This difference is due to the shifted location of the replicated projected pixel pattern RPP, for which the energy indicated in the signal S1 may be considered to be split between the projected pixel pattern PPP and the replicated projected pixel pattern RPP in the implementation of FIG. 8. This results in a better distribution of the energy levels in the signal S2, as indicated by the higher resolution sine wave shape. This higher resolution sign wave corresponds to a lower spatial harmonic content, which results in higher accuracies for the corresponding SIM Z-height measurements that are produced.

FIGS. 9A-9D are diagrams illustrating various aspects of a projector artifact suppression element PASE and associated split light rays that may be utilized to replicate a projected pixel pattern as part of a structured illumination pattern. As shown in FIG. 9A, an original light ray OLR is illustrated as entering at least a first layer of birefringent material of a projector artifact suppression element PASE at a first entrance point ENP1, and is then shown to be divided into an ordinary ray R11 and an extraordinary ray R21 which exit the layer of the projector artifact suppression element PASE at exit points EXP1 and EXP2, respectively. The offset between the rays R11 and R21 is represented as a desired suppression element shift DSES. An equation usable for determining a desired suppression element shift DSESx in microns along a direction corresponding to the projected X-axis of the projector pixel array is:

$$DSESx = (PPx) \times (N + Kfs) \times MAPASE \qquad (Eq. 2)$$

where PPx is the projector pixel pitch along the X-axis of the projector pixel array (e.g., PPx=10 micrometers/pixel), N is a desired integer number of projector pixels to shift and Kfs is the additional desired projector pixel fraction shift along the X-axis direction (e.g., Kfs=0.5 pixels), and MAPASE is the magnification of the projected pattern at the projector artifact suppression element (e.g., MAPASE=1.0). It will be appreciated that shifts by an integer number of pixels along a direction that matches a pattern period along the same direction are approximately indistinguishable from no shift. Therefore, such an integer shift may be added to a desired projector pixel fraction shift if desired, for example, in order to allow the use of a thicker birefringent layer to achieve a desired projector pixel fraction shift, or the like. However, it will be understood that in general an integer projector pixel shift is not necessary, and in various embodiments it may be convenient and/or advantageous if N=0. As will be described in more detail below with respect to FIGS. 9B-9D, in one implementation, a plurality of layers of birefringent material in a projector artifact suppression element PASE may be utilized to produce an additional set of rays R12 and R22. For example, an analogous desired suppression element shift DSESy in microns may be provided along a direction corresponding to the projected Y-axis of the projector pixel array, if desired. Of course, more generally, a projector artifact suppression element such as that outlined below with respect to FIGS. 9B-9D may be dimensioned and/or rotated to provide multiple pattern replications having respective offset amounts and/or offset directions along any desired direction(s) transverse to the an input ordinary ray (e.g., the ray R11), as may be determined by one of ordinary skill in the art based on the principles disclosed herein. The above equation for defining a desired suppression element shift DSESx in micrometers may be related to the projected pattern shift PPSx as described above with respect to FIG. 8. When N=0, the shift PPSx in terms of fractions of a projector pixel is the fraction Kfs. The shift PPSx in terms of micrometers at a location "i" along the projection and/or imaging path is PPSx=(DSESx)×(Mi/MAPASE), where Mi is the projected pattern magnification at the location i.

As shown in FIGS. 9B and 9C, in one specific example implementation the projector artifact suppression element PASE includes three layers L1, L2 and L3. As shown in FIG. 9B, outer surfaces S1 and S2 of the first and third layers L1 and L3 may be designated as the outer surfaces of the projector artifact suppression element PASE. In one specific example implementation, the overall thickness of the projector artifact suppression element PASE may be approximately 2.2 mm. FIG. 9C includes a table indicating other specific dimensions and properties for the layers L1, L2 and L3 of the implementation FIG. 9B. As shown in FIG. 9C, all of the layers L1-L3 are indicated as being made of quartz. The first layer 1l is indicated as having a thickness of 0.92+/−0.05 mm, an orientation angle of +45+/−1°, and a rotation angle of 0+/−1°. The second layer L2 is indicated as having a thickness of 0.65+/−0.05 mm, an orientation angle of +45+/−1°, and a rotation angle of +45+/−1°. The third layer L3 is indicated as having a thickness of 0.65+/−0.05 mm, an orientation angle of +45+/−1°, and a rotation angle of −45+/−1°. In one implementation, the second and third layers L2 and L3 may consist of birefringent material. The first layer L1 may thus cause a first split in a first direction in incoming light rays with the second and third layers L2 and L3 causing a second split in a second direction in the light rays (e.g., in total effect splitting an original light ray OLR into the four light rays R11, R21, R12 and R22.) The dimensions in the example above are exemplary only, and not limiting. More generally, in various other embodiments, the thicknesses of the various birefringent layers may be on the order of 100 micrometers to 1 millimeter or more.

As shown in FIG. 9D, in one implementation the four light rays R11, R21, R12 and R22 that are produced by the projector artifact suppression element PASE are approximately evenly separated along the X- and Y-axes. The offset along the X-axis (e.g., between the light rays R11 and R21 and between the light rays R12 and R22) is represented as an X-direction desired suppression element shift DSESx. Similarly, the offset along the Y-axis (i.e., between the light rays R11 and R12 and between the light rays R21 and R22) is represented as a Y-direction desired suppression element shift DSESy. In one specific example implementation, DSESx=DSESy=5.4 microns.

Figure 10:
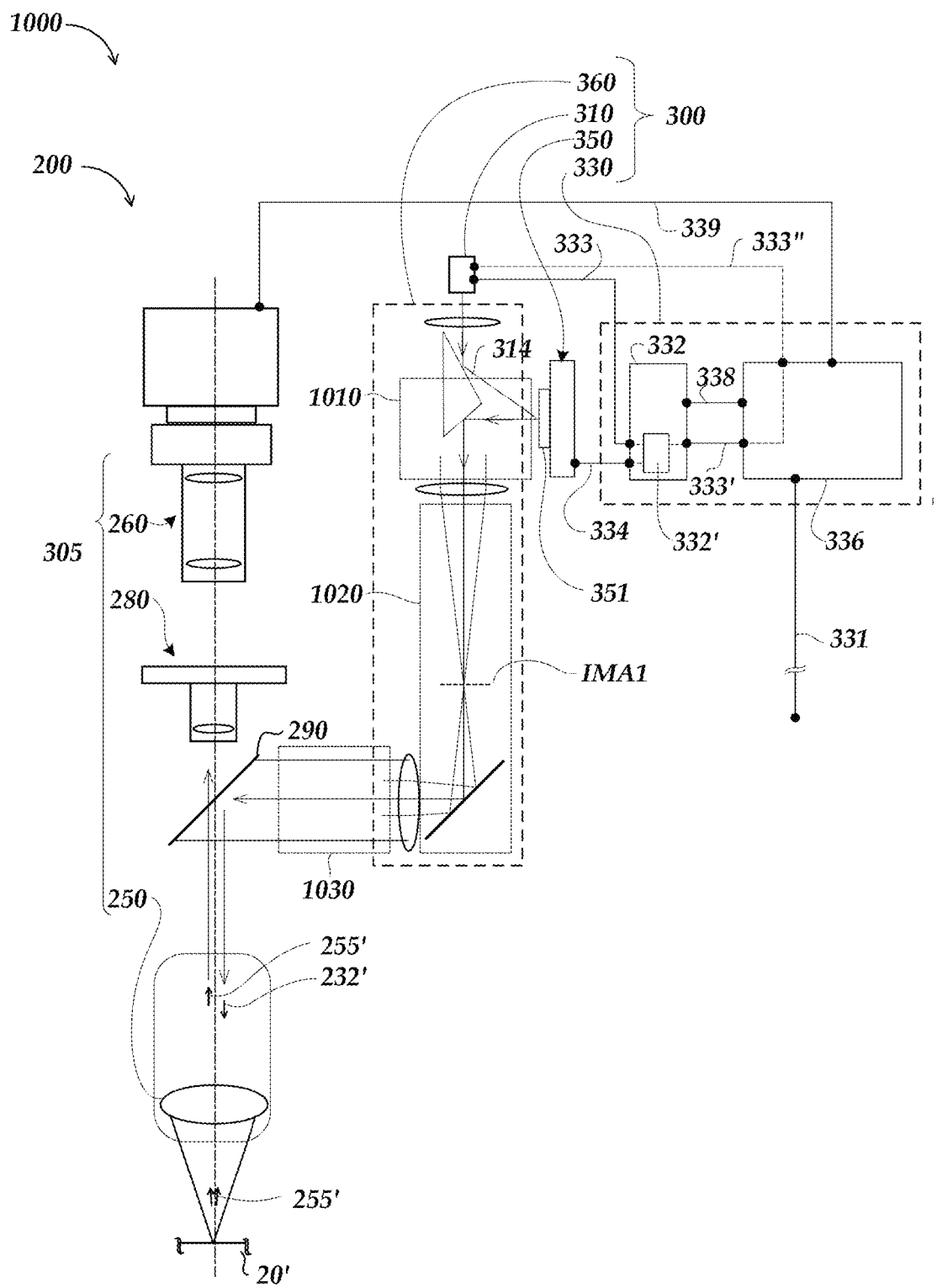
FIG. 10 is a block diagram including the exemplary embodiment of the structured illumination pattern generator shown in FIG. 3, and further illustrating locations where a projector artifact suppression element may be included.

FIG. 10 is a block diagram of a system 1000 including the exemplary embodiment of the structured illumination pattern generator shown in FIG. 3, and further illustrating a series of ranges 1010, 1020 and 1030 where a projector artifact suppression element PASE may be located. It will be appreciated that many of the components of FIG. 10 may be similar or identical to those of FIG. 3, and operate similarly except as otherwise described below. As shown in FIG. 10, the first range 1010 is located in the projection path approximately adjacent to the SLM 350, the third range 1030 is located in the projection path approximately adjacent to the beamsplitter 290, and the second range 1020 is located between the first and third ranges 1010 and 1030.

In general, the selection of a range 1010, 1020 or 1030 in which to locate the projector artifact suppression element PASE may be determined in accordance with various tradeoffs associated with certain design factors. For example, in certain implementations, it may be beneficial to locate the projector artifact suppression element in a region where the light rays are collimated (e.g., where fewer aberrations may result). It may also be beneficial for the projector artifact suppression element to be located in the projection path before demagnification is performed (e.g., resulting in relatively less complex and inexpensive fabrication). In certain implementations, such benefits may be mutually exclusive and/or unable to be obtained in a single location.

For example, in one implementation, for the first range 1010, the light is not collimated, however the focal ratio may be relatively large such that the calculated effect on spherical aberration and astigmatism may be relatively low, and placement in this range may result in relatively less complex and inexpensive fabrication. With regard to the range 1020, the light rays are converging and diverging (i.e., are not collimated), and it may be desirable to place the projector artifact suppression element somewhere near, but not coincident with the intermediate image plane IMA1. Placing the projector artifact suppression element near the intermediate image plane IMA1 allows the size of the glass to be minimized (e.g., to reduce tolerance requirements, flatness, etc.), but also requires that the placement be distant enough so that no ghost reflections become present in the projected pattern. These requirements may make the fabrication relatively more expensive and complex for a placement in this range 1020. In the third range 1030, the light may be collimated and may not impart aberrations, but may require relatively expensive elements to achieve a desired separation distance and fabrication. In one specific example implementation, the thicknesses of the birefringent layers may be on the order of 150-250 microns in thickness, thus requiring super-thin quartz layers. Regardless of these tradeoffs, any of the ranges 1010, 1020 or 1030 may be utilized, with the selection generally depending on a balance between reducing the complexity and expense of the fabrication and increasing the desired level of accuracy for the system.

In general, other aspects of the design of the structured illumination pattern generator 1000 of FIG. 10 will be understood in the context of the following discussion. As described above with respect to the signals S1 and S2 of FIGS. 7 and 8, the sinusoidal fringes of the system are created with a digital SLM device and some higher harmonics of the fundamental sinusoidal frequency may be transferred by the optics through to the final image in each scan step of the stack. As noted above, the resulting height maps may contain these higher harmonic artifacts as "ripples". In addition, as also described above, the SLM and resulting projected pixel pattern have gaps between each pixel, and the gap pitch can beat at two different values relative to the imaging pixel array pitch, each causing respective Z-height error "ripples".

In contrast to the techniques described above with respect to FIGS. 8-10 where a projector artifact suppression element is utilized to address such issues, an alternative approach for optically filtering resulting ripples such as those described above would be to reduce the projection-side numerical aperture NA appreciably. However, in certain implementations this approach would have negative implications for aspects such as: the selection of the SLM resolution (e.g., higher fringe frequencies); telecentricity (e.g., finite pupil distances); collection lens complexity (e.g., higher field angles); and throughput (e.g., lower illumination). Another possible alternative approach would be to utilize a higher resolution SLM (e.g., a high definition system where more pixels are utilized to create the sine pattern). However, in certain implementations various drawbacks of such an approach could include: the higher field angles would require higher quality projection optics (e.g., at higher cost); the SLM would be correspondingly more expensive to produce; and such a configuration would not address the above-described effects of the mismatch of SLM pixel pitch and gap against the imaging pixel pitch. Another alternative approach that has been used in some applications is defocusing the projected pattern. However, in applications where a stack of SIM images are acquired by scanning through a focus range to determine a 3-D surface topography, this is not a practical approach. Another alternative approach that could be utilized would involve fabricating fixed chrome on glass fringe patterns that are free of gap artifacts and/or provide sine waves with lower spatial harmonic content. However, in certain implementations various drawbacks of such an approach could include: the orientation and/or pattern size of the fixed pattern cannot be adjusted or optimized for particular workpieces and/or objective lenses or magnifications, or the like. Furthermore, sine wave pattern masks with sufficiently low spatial harmonic content may be expensive to fabricate.

In contrast to all of the above-described alternative approaches, it will be appreciated that the techniques described above with respect to FIGS. 8-10, including the utilization of a projector artifact suppression element, may provide better results, including less expensive fabrication and higher accuracy measurements. In particular, the above-described techniques utilizing the projector artifact suppression element achieve various advantages by not substantially altering the numerical aperture NA that would otherwise be provided by the set of projection optical elements of the SIM system. That is, the projection optics utilizing the projector artifact suppression element are able to reduce the modulation transfer function (i.e., decrease the spatial harmonic content) without reducing the numerical aperture, so as to maintain good optical sectioning capability and throughput, and to allow for fringe frequencies that are compatible with an intermediate format SLM.

Figure 11:
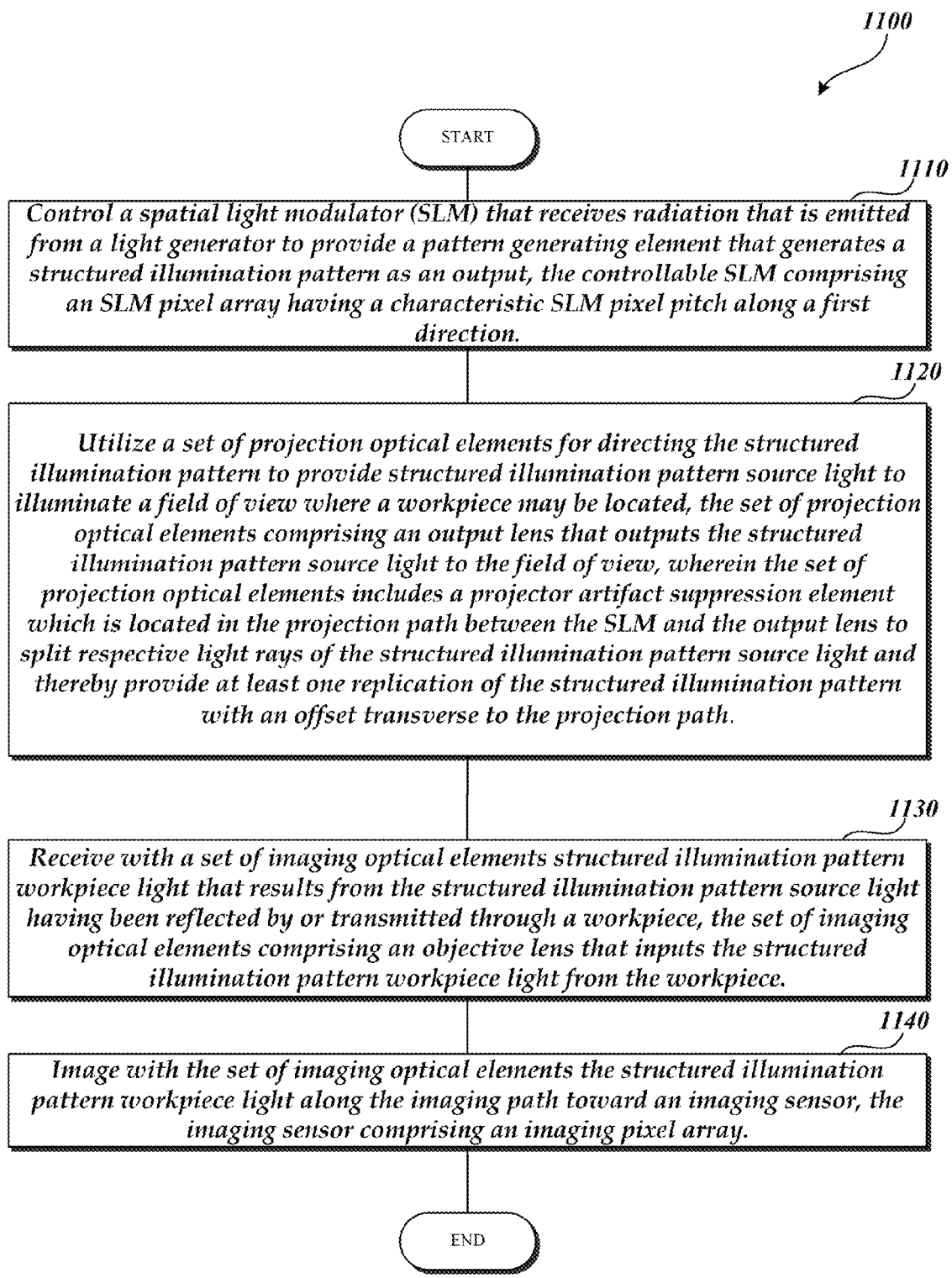
FIG. 11 is a flow diagram illustrating one exemplary embodiment of a routine for operating a SIM optical arrangement including a projector artifact suppression element, according to principles disclosed herein.

FIG. 11 is a flow diagram illustrating one exemplary embodiment of a routine 1100 for operating a structured illumination microscopy (SIM) optical arrangement including a projector artifact suppression element, according to principles disclosed herein. At block 1110, a controllable spatial light modulator (SLM) that receives radiation that is emitted from a light generator is controlled to generate a structured illumination pattern as an output. In various implementations, the controllable SLM comprises an SLM pixel array having a characteristic SLM pixel pitch along a first direction. At block 1120, a set of projection optical elements is utilized for directing the structured illumination pattern to provide structured illumination pattern source light to illuminate a field of view where a workpiece may be located. In various implementations, the set of projection optical elements comprises an output lens that outputs the structured illumination pattern source light to the field of view. The set of projection optical elements is configured to include a projector artifact suppression element located in the projection path between the SLM and the output lens. The projector artifact suppression element is utilized to split respective light rays of the structured illumination pattern source light and thereby provide at least one replication of the structured illumination pattern with an offset transverse to the projection path. In some embodiments, the projector artifact suppression element is advantageously configured such that its presence does not substantially alter the numerical aperture of the set of projection optical elements. In some embodiments, the projector artifact suppression element may be advantageously configured to split respective rays of the structured illumination pattern source light into a respective ordinary ray and a respective extraordinary ray such that an ordinary ray structured illumination pattern continues along the projection path and at least one extraordinary ray structured illumination pattern is the replication of the structured illumination pattern which continues along the projection path with an offset from the ordinary ray structured illumination pattern transverse to the projection path.

At block 1130, a set of imaging optical elements are utilized to receive structured illumination pattern workpiece light that results from the structured illumination pattern source light having been reflected by or transmitted through a workpiece. In various implementations, the set of imaging optical elements comprises an objective lens that inputs the structured illumination pattern workpiece light from the workpiece. At block 1140, the set of imaging optical elements are utilized to image the structured illumination pattern workpiece light along the imaging path toward an imaging sensor. In various implementations, the imaging sensor comprises an imaging pixel array.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

Although the embodiments described above have emphasized the utility of a projector artifact suppression element in combination with a pattern generating element that comprises a controllable spatial light modulator, which may be controlled to alter or reconfigure a structured light pattern, it should be appreciated that a projector artifact suppression element according to principles disclosed herein may also provide benefits and advantages outlined herein when used in combination with a fixed pattern generating element such as a reflective or transmissive mask. For example, inaccuracies due to certain fabrication errors, or limited spatial resolution and/or low sine wave gray-level resolution or the like may be reduced.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A structured illumination microscopy (SIM) optical arrangement, comprising:
a projection path comprising:
a light generator that emits radiation;
a pattern generating element that receives radiation that is emitted from the light generator and which generates a structured illumination pattern as an output; and
a set of projection optical elements for directing the structured illumination pattern to provide structured illumination pattern source light to illuminate a field of view where a workpiece may be located, the set of projection optical elements comprising an output lens that outputs the structured illumination pattern source light to the field of view; and
an imaging path comprising:
an imaging sensor, the imaging sensor comprising an imaging pixel array; and
a set of imaging optical elements for receiving structured illumination pattern workpiece light that results from the structured illumination pattern source light having been reflected by or transmitted through the workpiece, and imaging the structured illumination pattern workpiece light along the imaging path toward the imaging sensor, the set of imaging optical elements comprising an objective lens that inputs the structured illumination pattern workpiece light from the workpiece,
wherein:
the set of projection optical elements further comprises a projector artifact suppression element located in the projection path between the pattern generating element and the output lens, the projector artifact suppression element configured to split respective light rays of the structured illumination pattern source light and thereby provide at least one replication of the structured illumination pattern with an offset transverse to the projection path.

2. The SIM optical arrangement of claim 1, wherein the output lens and the objective lens are the same lens.

3. The SIM optical arrangement of claim 2, wherein the set of projection optical elements further comprises a beamsplitter which is located in the projection path such that the structured illumination pattern is directed from the beamsplitter as coaxial light to the output lens, and the objective lens inputs the structured illumination pattern workpiece light and transmits it through the beamsplitter and along the imaging path.

4. The SIM optical arrangement of claim 1, wherein the projector artifact suppression element is configured such that its presence does not substantially alter a numerical aperture of the set of projection optical elements.

5. The SIM optical arrangement of claim 1, wherein the projector artifact suppression element is configured to split respective rays of the structured illumination pattern source light into a respective ordinary ray and a respective extraordinary ray such that an ordinary ray structured illumination pattern continues along the projection path and at least one extraordinary ray structured illumination pattern is the replication of the structured illumination pattern which continues along the projection path with an offset from the ordinary ray structured illumination pattern transverse to the projection path.

6. The SIM optical arrangement of claim 5, wherein the projector artifact suppression element comprises at least a first birefringent layer of material.

7. The SIM optical arrangement of claim 6, wherein the projector artifact suppression element further comprises at least a second birefringent layer of material.

8. The SIM optical arrangement of claim 7, wherein the projector artifact suppression element is configured to provide at least two replications of the structured illumination pattern with different offset amounts or directions transverse to the projection path.

9. The SIM optical arrangement of claim 5, wherein:
the pattern generating element comprises a controllable spatial light modulator (SLM) comprising an SLM pixel array having a characteristic SLM pixel pitch PP along a row or column axis of the SLM pixel array;
a projected pattern pixel pitch PP in the structured illumination pattern at the projector artifact suppression element is approximately equal to the characteristic SLM pixel pitch multiplied by the magnification of the structured illumination pattern at the location of the projector artifact suppression element, and the offset of the replication of the structured illumination pattern that is traverse to the projection path is PP times (N+K) at the location of the projector artifact suppression element, where N is an integer and K is a fraction.

10. The SIM optical arrangement of claim 9, wherein K is approximately one half.

11. The SIM optical arrangement of claim 9, wherein N=0 and the offset is PP times K and is related to a thickness of at least one birefringent layer of material of the projector artifact suppression element.

12. The SIM optical arrangement of claim 11, wherein the thickness of the at least one birefringent layer of material of the projector artifact suppression element is in a range between 100 micrometers and 1.0 millimeters.

13. The SIM optical arrangement of claim 11, wherein the offset is in a range between 1.0 micrometers and 10 micrometers.

14. The SIM optical arrangement of claim 9, wherein the SLM pixel array comprises gaps between adjacent pixels, and the projector artifact suppression element at least partially reduces intensity variations in the imaging pixel array due to gap image artifacts arising from the gaps between adjacent pixels in the SLM pixel array.

15. The SIM optical arrangement of claim 14, wherein the projector artifact suppression element is configured to reduce the intensity variations in the imaging pixel array based on replicating the gap image artifacts in the at least one replication of the structured illumination pattern such that due to the offset more pixels in the imaging pixel array receive similar amounts of the gap image artifacts.

16. The SIM optical arrangement of claim 1, wherein the set of projection optical elements comprises a magnification lens arrangement along the projection path between the pattern generating element and the output lens, and the projector artifact suppression element is located in the projection path after the magnification lens arrangement and before the output lens or after the pattern generating element and before the magnification lens arrangement.

17. The SIM optical arrangement of claim 1, wherein the projector artifact suppression element is located in the projection path where the structured illumination pattern source light is substantially collimated.

18. The SIM optical arrangement of claim 1, wherein the structured illumination pattern is a fringe pattern with a long direction of fringes extending along a direction that is transverse to a direction of the offset of the at least one replication of the structured illumination pattern.

19. A method for operating a structured illumination microscopy (SIM) optical arrangement for obtaining measurements of a workpiece, comprising:
controlling a controllable spatial light modulator (SLM) that receives radiation that is emitted from a light generator to generate a structured illumination pattern as an output, the controllable SLM comprising an SLM pixel array having a characteristic SLM pixel pitch along a first direction;
utilizing a set of projection optical elements for directing the structured illumination pattern to provide structured illumination pattern source light to illuminate a field of view where the workpiece may be located, the set of projection optical elements comprising an output lens that outputs the structured illumination pattern source light to the field of view;
receiving with a set of imaging optical elements structured illumination pattern workpiece light that results from the structured illumination pattern source light having been reflected by or transmitted through the workpiece, the set of imaging optical elements comprising an objective lens that inputs the structured illumination pattern workpiece light from the workpiece;
imaging with the set of imaging optical elements the structured illumination pattern workpiece light along an imaging path toward an imaging sensor, the imaging sensor comprising an imaging pixel array; and
utilizing a projector artifact suppression element which is included in the set of projection optical elements and which is located in a projection path between the SLM and the output lens to split respective light rays of the structured illumination pattern source light and thereby provide at least one replication of the structured illumination pattern with an offset transverse to the projection path.

20. A machine vision inspection system comprising:
an imaging sensor comprising an imaging pixel array;
a set of imaging optical elements for receiving structured illumination pattern workpiece light that results from structured illumination pattern source light having been reflected by or transmitted through a workpiece, and imaging the structured illumination pattern workpiece light along an imaging path toward the imaging sensor, the set of imaging optical elements comprising an objective lens that inputs the structured illumination pattern workpiece light from the workpiece;
a light generator that emits radiation;
a controllable spatial light modulator (SLM) that receives radiation that is emitted from the light generator and which is controlled for generating a structured illumination pattern as an output, the controllable SLM comprising an SLM pixel array having a characteristic SLM pixel pitch along a first direction;
a set of projection optical elements for directing the structured illumination pattern to provide the structured illumination pattern source light to illuminate a field of view where the workpiece may be located, wherein the set of projection optical elements comprises a configuration wherein the objective lens used as an output lens that outputs the structured illumination pattern source light to the field of view; and
a projector artifact suppression element located in a projection path between the controllable SLM and the output lens, the projector artifact suppression element configured to split respective light rays of the structured illumination pattern source light and thereby provide at least one replication of the structured illumination pattern with an offset transverse to the projection path.

* * * * *

UNITED STATES PATENT AND TRADEMARK OFFICE
CERTIFICATE OF CORRECTION

PATENT NO.         : 9,182,583 B2                                        Page 1 of 1
APPLICATION NO.    : 14/081885
DATED              : November 10, 2015
INVENTOR(S)        : Frans De Nooij et al.

It is certified that error appears in the above-identified patent and that said Letters Patent is hereby corrected as shown below:

Item (56):
"Wikipedia, the free encyclopedia, "Moirépattern," <en.wikipedia.org/wiki/Moir%C3%A9_pattern>, retrieved on October 10, 2013, 9 pages." should read,
--Wikipedia, the free encyclopedia, "Moiré pattern,"
<en.wikipedia.org/wiki/Moir%C3%A9_pattern>, retrieved on October 10, 2013, 9 pages.--.

Signed and Sealed this
Seventh Day of June, 2016

Michelle K. Lee
*Director of the United States Patent and Trademark Office*